(No Model.)
D. G. WEEMS.
Oyster Float.
No. 239,592. Patented March 29, 1881.
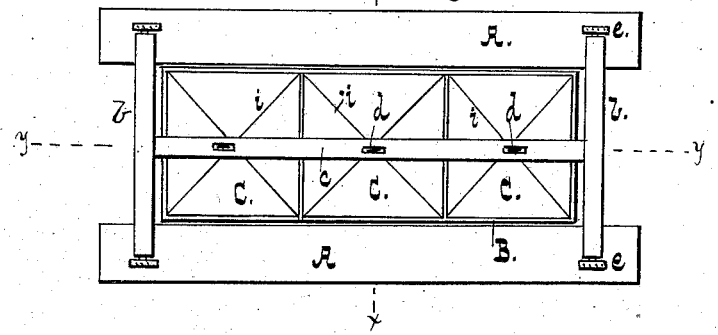
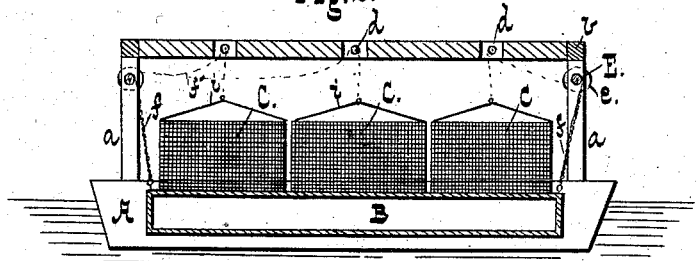
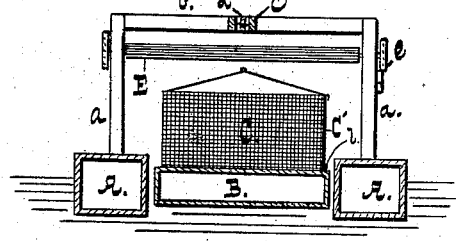
Witnesses,
N. A. Bertram
C. H. Crist
Inventor,
David G. Weems.
by
R. D. Williams
Attorney.

UNITED STATES PATENT OFFICE.

DAVID G. WEEMS, OF BALTIMORE, MARYLAND.

OYSTER-FLOAT.

SPECIFICATION forming part of Letters Patent No. 239,592, dated March 29, 1881.

Application filed January 13, 1881. (No model.)

*To all whom it may concern:*

Be it known that I, DAVID G. WEEMS, of Baltimore city, State of Maryland, have invented certain new and useful Improvements in Oyster-Floats; and I hereby declare the same to be fully, clearly, and exactly described as follows, reference being had to the accompanying drawings, in which—

Figure 1 is a plan view of the device; Fig. 2, a section on line *y y*, and Fig. 3 a section on line *x x*, of Fig. 1.

My invention relates to what are known as "oyster-floats," designed to immerse a cargo of oysters in brackish water in order to fatten them; and it consists in a device adapted to subserve that end constructed and operating substantially as hereinafter set forth.

In the accompanying drawings, A is a scow, by preference consisting of two separate floats, as a catamaran, having uprights *a a*, connected by cross-pieces *b b*, which in turn are joined by a beam, *c*. By preference, the scow A is open-ended at one or both ends, as shown, though, in lieu of this construction, it may simply have a central well.

B is a float or air-tight compartment of a size to nearly fit in the central opening of the scow A, and on it rests a series (preferably three) of crates, *c c*, having spiders *i*.

Between the uprights *a* are journaled rollers E, having drums *e* on their shafts provided with holes for the insertion of bars or handspikes, whereby the rollers are turned. A suitable ratchet-and-pawl attachment prevents reverse rotation as desired. From eyebolts in the ends of the scow B extend chains *f* to the rollers E.

The center beam, *c*, is provided with sheaves *d*, over which chains *f'* may be led from the crate-spiders *i* to the drums or rollers E.

In operation, the crates being filled with the oysters, the scow A is towed to the feeding-ground and the float B is allowed to sink until the oysters are submerged, the scow being brought to anchor. When the oysters are fattened, generally at the end of one or two tides the float B is raised by turning the rollers E, and the scow is towed to the wharf to discharge the oysters. This is conveniently done in one of several ways, as follows: The crates C are lifted by means of the chains *f'*, either simultaneously or in succession, clear of the scow B, which is floated out from the scow A, and suitable boats or floats are floated under the crates to receive the oysters, which are then transported away, the scow being immediately ready to receive a fresh cargo; or, in lieu of this, a side, *c'*, of each crate is hinged at *l*, and is lowered, serving as a chute to deliver the oysters laterally upon the pier or upon a scow or boat made fast alongside.

The float B is merely intended to facilitate the raising of the crates, and may, if desired, be dispensed with entirely.

I am fully aware that floating pontons are very old for purposes analogous to the one to which I adapt them, and such I do not claim; but I do claim—

1. In an oyster-float, a scow having a central opening, in combination with a float located therein and one or more crates arranged to rest upon and sink the float, as set forth.

2. In an oyster-float, a scow having a central opening and a series of crates to receive the oysters, and hoisting and lowering mechanism located above the central opening and adapted, as described, to submerge and raise the crates, as set forth.

3. In combination with a scow having a central opening, hoisting and lowering mechanism located thereover, and one or more crates having hinged sides, adapted to shoot the contents of the crates over the sides of the scow, as set forth.

DAVID G. WEEMS.

Attest:
R. D. WILLIAMS,
W. A. BERTRAM.